United States Patent [19]

Breen

[11] 4,009,352

[45] Feb. 22, 1977

[54] MULTIPLE LINK CIRCUIT FOR A PORT MULTIPLEXER

[75] Inventor: Barry C. Breen, Woodinville, Wash.

[73] Assignee: Tel-Tone Corporation, Kirkland, Wash.

[22] Filed: Jan. 19, 1976

[21] Appl. No.: 650,303

[52] U.S. Cl. .................. 179/18 FF; 179/15 AT
[51] Int. Cl.$^2$ ........................ H04M 3/22
[58] Field of Search ....... 179/18 FD, 18 FE, 18 FF, 179/18 FG, 18 J, 18 G, 18 AB, 18 H, 18 AD, 15 AT, 18 F; 340/147 LP

[56] References Cited

UNITED STATES PATENTS

| | | | |
|---|---|---|---|
| 3,691,310 | 9/1972 | Fenton | 179/18 AD |
| 3,909,544 | 9/1975 | Richards et al. | 179/18 FG |
| 3,946,163 | 3/1976 | Asmussen et al. | 179/18 J |

Primary Examiner—Thomas A. Robinson
Attorney, Agent, or Firm—Christensen, O'Connor, Garrison & Havelka

[57] ABSTRACT

A multiple link circuit for coupling a plurality of telephone lines to the ports of a port multiplexer without requiring the splitting of C-leads is disclosed. The multiple link circuit includes an internal priority determining arrangement that eliminates the need for individual links to be scanned by an address scanner. Each link of the multiple link circuit is bridge connected to a C-lead and includes: a busy detector for detecting the busy status of the C-lead; and, a control circuit for controlling the coupling of a subscriber seized telephone line to the associated port. The priority determining arrangement prevents any lower priority control circuit from coupling a seized telephone line to the associated port if any higher priority line is simultaneously attempting to be so coupled. After signal processing (performed by a signal processor connected to the port) has ended, or some other release action occurs, a port generated release signal disconnects the seizing link from the port. While any link is connected to an associated port, make-busy ground circuits forming part of each link apply false busy status information to all of the C-leads connected to the other links of the multiple link circuit. The false busy status information prevents the linefinders associated with these other links from attempting to seize the busy port via those links. Termination of the conversation flowing through one link creates a WINK signal that causes the linefinder to release the associated line, if another link is connected to the associated port at the time the conversation is terminated.

17 Claims, 5 Drawing Figures

MULTIPLE LINK CIRCUIT FOR A PORT MULTIPLEXER

RELATIONSHIP TO OTHER APPLICATIONS

This application is related to United States Patent application, Ser. No. 559,032 entitled "Port Multiplexers For Telephone Signal Processing Systems" filed Mar. 17, 1975 by Daniel R. Asmussen and Barry C. Breen, now U.S. Pat. No. 3,946,163, issued Mar. 23, 1976. The information contained in this U.S. patent is hereby incorporated herein by reference.

BACKGROUND OF THE INVENTION

This invention is related to telephone systems and, more particularly, to telephone signal processing systems including a port multiplexer for connecting a plurality of linefinders and first selectors to a telephone signal processor, such as a tone-to-pulse converter.

As described in the above-referenced U.S. patent incorporated herein by reference, as noted above, port multiplexers are electronic circuits adapted to couple a plurality of linefinder/first selector combinations to a signal processor, such as a tone-to-tone pulse converter. When needed, the port multiplexer connects a seized telephone line to the signal processor. The signal processor processes information received from a related linefinder, and transmits processed information, via the port multiplexer, to a related first selector. For example, when a subscriber picks up the handset of a DTMF (dual tone multifrequency) telephone and seizes a linefinder in a system not adapted to transmit DTMF signals, a port multiplexer, if included in such a system, couples the DTMF telephone to an idle tone-to-pulse converter (signal processor). The depression of the push buttons of the DTMF telephone, which cause dual tones to be generated, is detected by the tone-to-pulse converter and converted into a series of rotary dial type pulses. These pulses are then transmitted via the port multiplexer to an associated first selector.

The port multiplexer described in the above-referenced U.S. patent includes a plurality of links that connect linefinder/first selector combinations to a plurality of ports which, in turn, are connected to signal processors. The links are connected between the linefinder/first selector combinations and are sequentially interrogated by an address generator/clock combination. When a link associated with a particular port is seized, the port causes all of the other links associated with it to place false busy status information on the C-leads connected to such other links, whereby related linefinders are prevented from attempting to seize the seized port. Upon termination of signal processing, the port and the port seizing link are released. Further, upon termination of a conversation, even though a port has been seized by another associated link, the conversation related line is released by the production of a WINK signal that interrupts the false busy status information for a short period of time.

While the links described in said U.S. patent have reduced the cost of port multiplexers, they have certain disadvantages. The present invention is directed to overcoming these disadvantages. For example, the links described in said U.S. patent require that the C-lead, not just the tip and ring leads, running between linefinders and first selectors be split. Then, a coupling portion of the link is connected in series with the C-lead. Since the C-lead carries certain information usable by other circuitry, splitting of the C-lead and the insertion of serial components causes undesirable electric circuit problems. For example, it prevents employees from making use of the make-busy switch normally associated with linefinders and first selectors. Thus, re-education of employees is required using this system. In addition, the links described in said U.S. patent have certain other disadvantages. For example, they require the inclusion of a clock and an address generator. Obviously, it would be desirable to eliminate the expense of these items and, thereby, reduce the cost, and improve the reliability, of links.

Therefore it is an object of this invention to provide a new and improved link.

It is a further object of this invention to provide a new and improved link system for linking a plurality of linefinder/first selector combinations to a port.

It is yet another object of this invention to provide a new and improved link arrangement that is more economical and more reliable than prior art links.

SUMMARY OF THE INVENTION

In accordance with principles of this invention, a multiple link circuit for coupling a plurality of telephone lines, e.g., linefinder/first selector combinations, to the ports of a port multiplexer without requiring the splitting of C-leads is provided. This result is accomplished by bridge connecting a detector or sensor to the C-lead. Preferably, the bridge connection is created by connecting the associated C-lead to a voltage divider and sensing the voltage fluctuations that occur across the voltage divider when a subscriber seizes a telephone line. In this way the busy status information carried by the C-lead is sensed. The multiple link circuit also includes an internal priority determining arrangement that eliminates the need for individual links to be scanned by an address scanner.

In accordance with further principles of this invention, each link of the preferred form of the multiple link circuit of the invention includes a busy detector for detecting the busy status of the C-lead connecting it to an associated linefinder/first selector combination. In addition, each link includes a control circuit for controlling the coupling of the tip and ring leads of the linefinder/first selector combination to an associated port when a subscriber seizes a telephone line.

In accordance with other principles of this invention, the priority determining arrangement prevents any lower priority control circuit from coupling a seized telephone line to the associated port if any higher priority line is simultaneously attempting to be so coupled. Prevention of such lower priority control circuit coupling includes dumping the lower priority line(s) and allowing it (them) to seek a link attached to an idle port.

In accordance with yet other principles of this invention, each link also includes a make-busy ground circuit that applies false busy status information to its associated C-lead when any link of the overall multiple link circuit is connected to the associated port. Further, termination of a conversation flowing through one link creates a WINK signal that causes the linefinder to release the associated line if another link is connected to the associated port at the time the conversation is terminated.

It will be appreciated from the foregoing summary that the invention provides a new and improved multiple link circuit suitable for use in a port multiplexer to couple a plurality of linefinder/first selector tip and ring lines to a port, the port in turn being connected to a suitable signal processor, such as a tone-to-pulse converter. The invention improves on prior art links, such as those described in said U.S. patent, referenced above, by eliminating the need for splitting C-leads. In addition, due to the inclusion of the priority determining arrangement, the multiple link circuit of the invention eliminates the necessity for the inclusion of an address scanner adapted to scan a plurality of links in sequence in order to prevent the disruption that might be caused by two links simultaneously attempting to be coupled to the same port.

BRIEF DESCRIPTION OF THE DRAWINGS

The foregoing objects and many of the attendant advantages of this invention will become more readily appreciated as the same becomes better understood from the following description of the preferred embodiments of the invention when taken in conjunction with the accompanying drawings, wherein.

DESCRIPTION OF THE PREFERRED EMBODIMENTS

Figure 1:
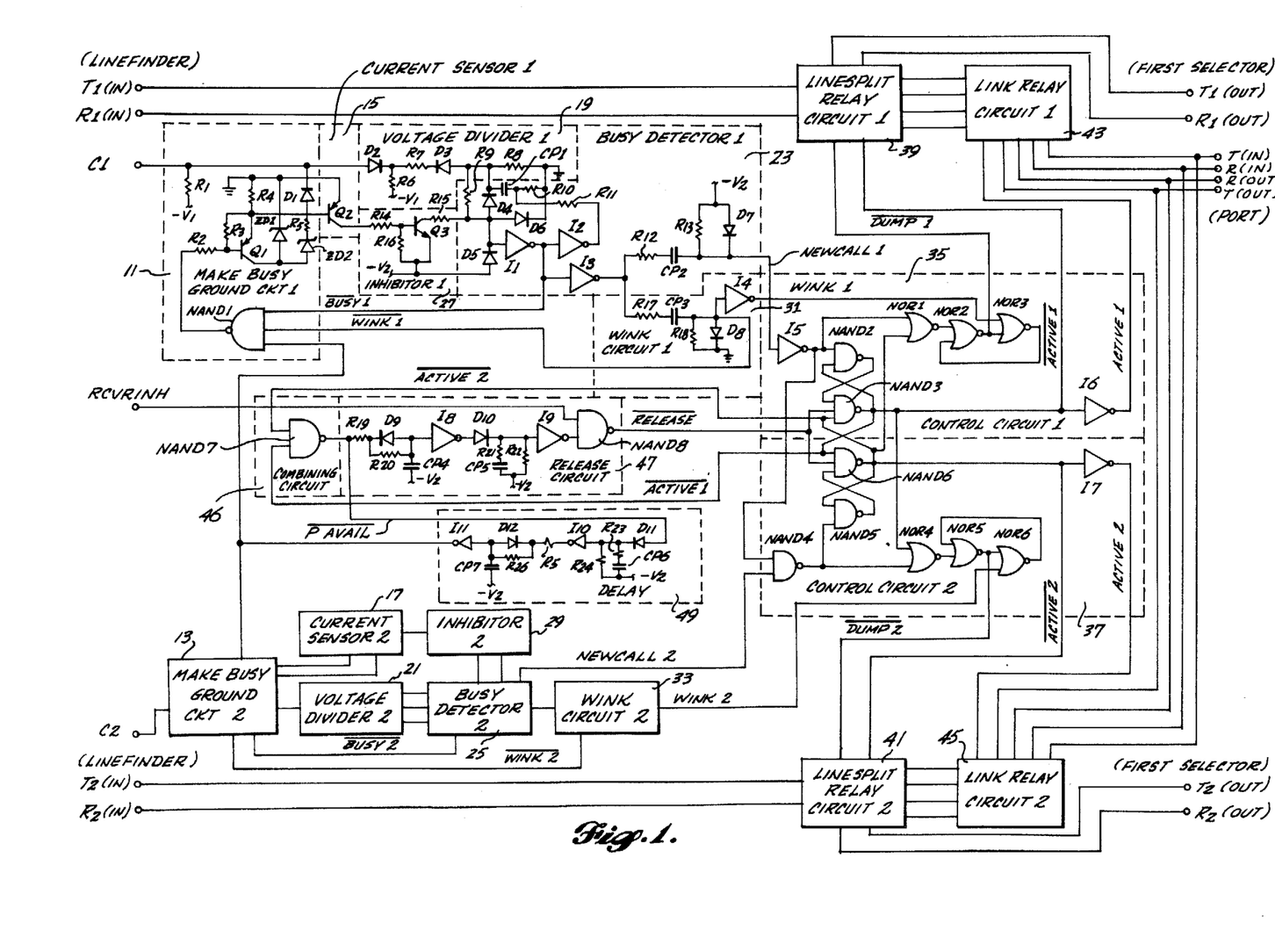
FIG. 1 is a partially block and partially schematic diagram of a dual link circuit formed in accordance with the invention.

FIG. 1 is a partially block and partially schematic diagram illustrating a dual link circuit formed in accordance with the invention. While FIG. 1 only illustrates two links forming part of the overall link circuit, as will be readily appreciated from the following description, particularly with respect to FIGS. 3–5, the dual link circuit illustrated in FIG. 1 can readily be expanded to include a larger number of links, for example, six links. Again, reference is made to said U.S. patent, referenced above and incorporated herein by reference, for a more detailed description of a port multiplexer with which the present invention is useful. In this regard, since certain circuits, such as a linesplit relay circuit and a link relay circuit are described in that patent, they are not illustrated in detail in FIG. 1 and, thus, not specifically described herein.

The embodiment of the invention illustrated in FIG. 1 includes: first and second make-busy ground circuits 11 and 13; first and second current sensors 15 and 17; first and second voltage dividers 19 and 21; first and second busy detectors 23 and 25; first and second inhibitors 27 and 29; first and second wink circuits 31 and 33; first and second control circuits 35 and 37; first and second linesplit relay circuits 39 and 41; first and second link relay circuits 43 and 45; a combining circuit 46; a release circuit 47; and, a delay circuit 49. Each of the dual links illustrated in FIG. 1, thus, comprises: a make-busy ground circuit; a current sensor; a voltage divider; a busy detector; an inhibitor; a wink circuit; a control circuit; a linesplit relay circuit; and, a link relay circuit. The combining, release and delay circuits are common to both of the links.

For ease of discussion and illustration, the separate circuitry related to one of the dual links is illustrated in the upper portion of FIG. 1 and the separate circuitry related to the other of the dual links is illustrated in the lower portion. The common circuitry is illustrated between the "upper" link and the "lower" link.

As with the link circuit illustrated in said U.S. patent, the linesplit relay circuits are suitable for connection to the tip and ring leads running to linefinders and to first selectors. Thus, tip and ring terminals suitable for connection to a first linefinder, designated T1(IN) and R1(IN), and tip and ring terminals suitable for connection to a first first selector, designated T1(OUT) and R1(OUT) are connected to the first linesplit relay circuit. Similarly, tip and ring terminals suitable for connection to a second linefinder, designated T2(IN) and R2(IN), and tip and ring terminals suitable for connection to a second first selector, designated T2(OUT) and R2(OUT) are connected to the second linesplit relay circuit. The line-split relay circuits are connected to the link relay circuits. And, the link relay circuits are connected to terminals suitable for connection to the inputs and outputs of a port. More specifically, the link relay circuits are both connected to four port terminals designated T(IN), T(OUT), R(IN) and R(OUT).

The C-lead, designated C1, associated with the tip and ring leads of the first linefinder/first selector combination is bridge connected to both the first make-busy ground circuit 11 and the first voltage divider 19. Similary, the C-lead, designated C2, associated with the second linefinder/first selector combination is bridge connected to both the second make-busy ground circuit 13 and the second voltage divider 21.

The voltage dividers sense or detect the voltage changes or fluctuations occurring on their related C-leads. Thus, when a linefinder connected to one of the dual links, is seized by an associated telephone going off-hook, the voltage across the related voltage divider varies. The first and second busy detectors 23 and 25 are connected to the first and second voltage dividers, respectively, to sense this voltage variation. When one of the busy detectors detects that a voltage divider has sensed or detected the voltage fluctuation caused by an associated telephone going off-hook, the output of the related busy detector designated NEWCALL (e.g., NEWCALL 1 or NEWCALL 2, as the case may be) changes from a binary zero state to a binary one state.

The change in state of NEWCALL, which is applied to the related control circuit, causes certain control signals to change states, if the other link is not simultaneously attempting to be attached to the port. These control signals are designated ACTIVE and $\overline{\text{ACTIVE}}$, followed by a one (1) or two (2), depending upon the link to which they relate. The change in the binary states of the ACTIVE (binary zero when link idle) and $\overline{\text{ACTIVE}}$ (binary one when link idle) indicates that the control circuit has become active. ACTIVE and $\overline{\text{ACTIVE}}$ are applied to their respective linesplit relay and link relay circuits and function in the manner described in said U.S. patent referenced above. That is, the change in states of ACTIVE and $\overline{\text{ACTIVE}}$ causes: (1) the related linesplit relay circuit to split the line; and, (2) the related link relay circuit to connect the linefinder tip and ring leads to the tip and ring inputs of the port and connect the tip and ring leads of the first selector to the tip and ring outputs of the port.

In addition, ACTIVE 1 and ACTIVE 2 are both applied to the combining circuit 46. The combining circuit combines these two signals and, when one of the two control circuits becomes active, shifts an output signal, designated P AVAIL, from an idle binary zero state to a binary one state. P AVAIL is applied to both the release circuit 47 and the delay circuit 49.

As will be better understood from the following description of a preferred embodiment of the delay circuit, P AVAIL, when it shifts from its idle (binary zero) state to its active (binary one) state, is not delayed by the delay circuit 49. Rather it is immediately applied to the make-busy ground circuits 11 and 13. The reverse, however, is not true. That is, the return of P-AVAIL to its idle state (which occurs upon the release of a link in the manner hereinafter described) is delayed. As also will be better understood from the following discussion, this delay prevents the make-busy ground circuits from terminating their make-busy ground immediately upon the release of a link. The delay is provided to allow the signal processor connected to the port to settle down or clear out in between attachments, i.e., reach a quiescent condition subsequent to the termination of one signal processing sequence and prior to the initiation of a second signal processing sequence.

In addition to generating NEWCALL signals, the busy detectors also each generate a signal designated BUSY, which is applied to their respective make-busy ground circuits. When the related C-lead is idle BUSY is in a binary one state. When the related voltage divider senses a C-lead voltage fluctuation caused by a telephone going off-hook, BUSY shifts to a binary zero state. BUSY remains in this state as long as the telephone remains off-hook, including during a conversation. As will be better understood from the following discussion, the zero state of BUSY is used to prevent the application of false busy status information to the related C-lead, since the existence of a zero BUSY denotes the existence of real busy status information.

In addition to BUSY and P AVAIL (from the delay circuit), the make-busy ground circuits also receive a signal designated WINK from their related WINK circuits. More specifically each wink circuit is connected to its related busy detector. The wink circuits generate two complementary signals, WINK and WINK. Normally, WINK is in a binary zero state and WINK is in a binary one state. Upon the termination of a conversation and the related telephone going on-hook, WINK and WINK change states. In the presence of a binary one P AVAIL being applied to the related make-busy ground circuit (discussed below), this state change delays the application of false busy status information for a short time period. The short time period is adequate to release the attached line, as more fully described hereinafter.

The make-busy ground circuits are adapted to apply false busy status information to their respective C-leads when the other link of the dual link is active, i.e., attached or becoming attached to the associated port and the related C-lead is not carrying real busy information. The binary condition for the application of false busy informaton is P AVAIL = 1; BUSY = 1; and, WINK = 1. Thus, if the "upper" link of FIG. 1 is attached to the port, the make-busy ground circuit 13 of the lower link will apply false busy status information to C2 because it will be receiving these binary signals, again assuming that the tip and ring leads related to the lower link are not carrying a conversation. In the latter circumstance C2 is carrying true busy information, whereby BUSY 2 is in a binary zero state.

The existence of false busy status information is detected by the related current detectors 15 and 17. The inhibitors are connected to the current sensors to detect when the current sensors sense false busy status information. When this condition is detected, the related inhibitor inhibits the operation of the related busy detector and, thereby, prevents NEWCALL from switching states. Thus, in the situation where the make-busy ground circuit 13 of the lower link is producing false busy status information, the busy detector 25 of that link is prevented from recognizing this signal as a valid line seizure or attempt at a line seizure.

WINK, as noted above, delays the application of the false busy status information generated by an associated make-busy ground circuit for a short period of time after a conversation, carried by the related link, terminates. This action only occurs if the other link is attached to the port when the conversation terminates since the make-busy ground circuit only generates the false busy status information during such attachment. Thus, for example, if the lower link of FIG. 1 is attached to the port when a conversation carried by the upper link terminates, a temporary reversal of the state of WINK 1 occurs. This temporary reversal (from one to zero) causes the first make-busy ground circuit 11 to temporarily delay the application of false busy status information to C1. This temporary delay of the false busy status information allows the related line to be released. After the temporary delay interval ends, false busy status information is applied, by the first make-busy ground circuit 11 to C1, to prevent a linefinder from attempting to seize the port via the upper link.

The control circuits also generate signals designated DUMP that perform the same function as the similarly defined signals in said U.S. patent. Specifically, the lower priority DUMP shifts from a binary one state to a binary zero state when the two links are simultaneously attempting a port seizure. The shifting DUMP signals causes a linesplit to occur without port attachment occurring. This action releases the related line, allowing the dumped line to seek a linefinder having a link having an available port. When the linefinder is released, the related WINK signal shifts from zero state to a binary one state, which action returns DUMP to a binary one state. A similar action will occur if the NEWCALL signal of one link shifts to a binary one state while the other link is attached.

In addition to P AVAIL, the release circuit also receives a receiver inhibit signal, designated RCVRINH, whose binary state is controlled by the port. When both links are idle, the port is idle and RCVRINH is in a binary one state. The release circuit is formed such that RELEASE is in a binary one state when either or both P AVAIL and RCVRINH are in binary zero states; and, in a binary zero state when both are in binary one states. Since P AVAIL is in a binary zero state when the links are idle RELEASE is in a binary one state when the links and port are idle.

As noted above when one of the links is seized P AVAIL shifts to a binary one state. This change does not cause an immediate change in RELEASE; rather its effect is delayed for a short period of time by a delay circuit forming part of the release circuit. When the tip and ring leads related to the seizing link are attached to the port, the port (by sensing loop current through itself) causes RCVRINH to shift to a binary zero state. If this action takes place before the end of the internal delay of the release circuit, $\overline{\text{RELEASE}}$ is maintained in a binary one state. When signal processing is complete $\overline{\text{RCVRINH}}$ returns to a binary one state causing $\overline{\text{RELEASE}}$ to shift to a binary zero state. This shift releases the activated control circuit, whereby ACTIVE and $\overline{\text{ACTIVE}}$ return to their idle states and P AVAIL returns to a binary zero state. The change of $\overline{\text{P AVAIL}}$ to a binary zero state causes $\overline{\text{RELEASE}}$ to return to a binary one state. The system is now ready to be seized again.

If for any reason the port fails to shift RCVRINH to a zero before the end of the internal delay of the release circuit, $\overline{\text{RELEASE}}$ shifts to a binary zero state and releases any activated control circuit. This action occurs, for example, if a make-busy switch on a linefinder is thrown, with no call in progress. Thus, a port is not tied-up when maintenance personnel throw make-busy switches for testing or maintenance reasons.

Turning now to a more detailed description of the circuits illustrated in FIG. 1, and a more detailed description of the operation of these circuits. Each make-busy ground circuit comprises: a PNP transistor designated Q1; two zener diodes designated ZD1 and ZD2; a diode designated D1; five resistors designated R1 – R5; and, a three input NAND gate designated NAND1.

R1 is bridge connected between the linefinder C-lead (C1 or C2) and a voltage source designated $-V1$. The three inputs of NAND1 receive $\overline{\text{BUSY}}$, $\overline{\text{WINK}}$ and $\overline{\text{P AVAIL}}$ signals, the latter delayed by delay circuit 49. The output of NAND1 is connected through R2 to the base of Q1 and through R3 in series with R4 to ground. The junction between R3 and R4 is connected to the emitter of Q1. The collector of Q1 is connected to the anode of ZD1, and the cathode of ZD1 is connected to ground. The collector of Q1 is also connected to the anode of ZD2. The cathode of ZD2 is connected through R5 to the anode of D1. The cathode of D1 is connected to the linefinder C-lead. When $\overline{\text{BUSY}}$, $\overline{\text{WINK}}$ and $\overline{\text{P AVAIL}}$ are all in binary one states, indicating that the related busy detector is not detecting true busy information on C1, the related wink circuit is not generating a temporary $\overline{\text{WINK}}$ reversal and the other link is attached to (or attempting to be attached to) the related port, the output of NAND1 is in a binary zero state. The binary zero output of NAND1 turns Q1 on causing the ground, at one end of R4, to be coupled to C1 through R4, Q1, ZD2, R5 and D1. In this manner, false busy status information (ground) is applied to C1 by the make-busy ground circuit.

It will be appreciated from the foregoing discussion that the make-busy ground circuits are basically grounding switches that connect the C-leads to ground when a certain set of conditions exist. ZD2 is provided to set a voltage threshold for the current sensor (hereinafter described) when an externally busy C-lead exists simultaneously with false busy status information (ground) created by a make-busy ground circuit. The threshold is set such that the current sensor activates the inhibitor at the same C-lead voltage as the voltage divider activates the busy detector when false busy status information is not present.

The current sensors each comprise a PNP transistor designated Q2. The base of Q2 is connected to the emitter of Q1. The emitter of Q2 is connected to ground. Q2, in essence, senses the flow of current through R4 and, thus, the series circuit applying false busy status information (ground) to C1.

Each voltage divider comprises: two diodes designated D2 and D3; and, three resistors designated R6, R7 and R8. The anode of D2 is connected to the related linefinder C-lead (C1 or C2.). The cathode of D2 is connected through R6 to $-V1$ and through R7 to the cathode of D3. The anode of D3 is connected through R8 to ground. The voltage dividers are, thus, uncomplicated diode voltage dividers that are bridge connected to the C-leads so as to sense the voltage fluctuation occurring thereon.

The busy detectors each comprise: four diodes designated D4 – D7; three inverters designated I1, I2 and I3; five resistors designated R9 – R13; and, two capacitors designated CP1 and CP2. The junction between D3 and R8 is connected to the cathode of D4. The anode of D4 is connected to the cathode of D5, and the anode of D5 is connected to a voltage source designated $-V2$. R9 is connected in parallel with D4. The junction between D4 and D5 is connected to the anode of D6 and to the input of I1. The cathode of D6 is connected to ground. The output of I1, whereat the signal designated $\overline{\text{BUSY}}$ is formed, is connected to the inputs of I2 and I3. The output of I2 is connected through R11 to the junction between CP1 and R10. The output of I3 is connected through R12 in series with CP2 and R13 to $-V2$. D7 is connected in parallel with R13, with its anode connected to $-V2$. The signal designated NEWCALL is formed at the junction between CP2, R13 and D7.

Figure 2:
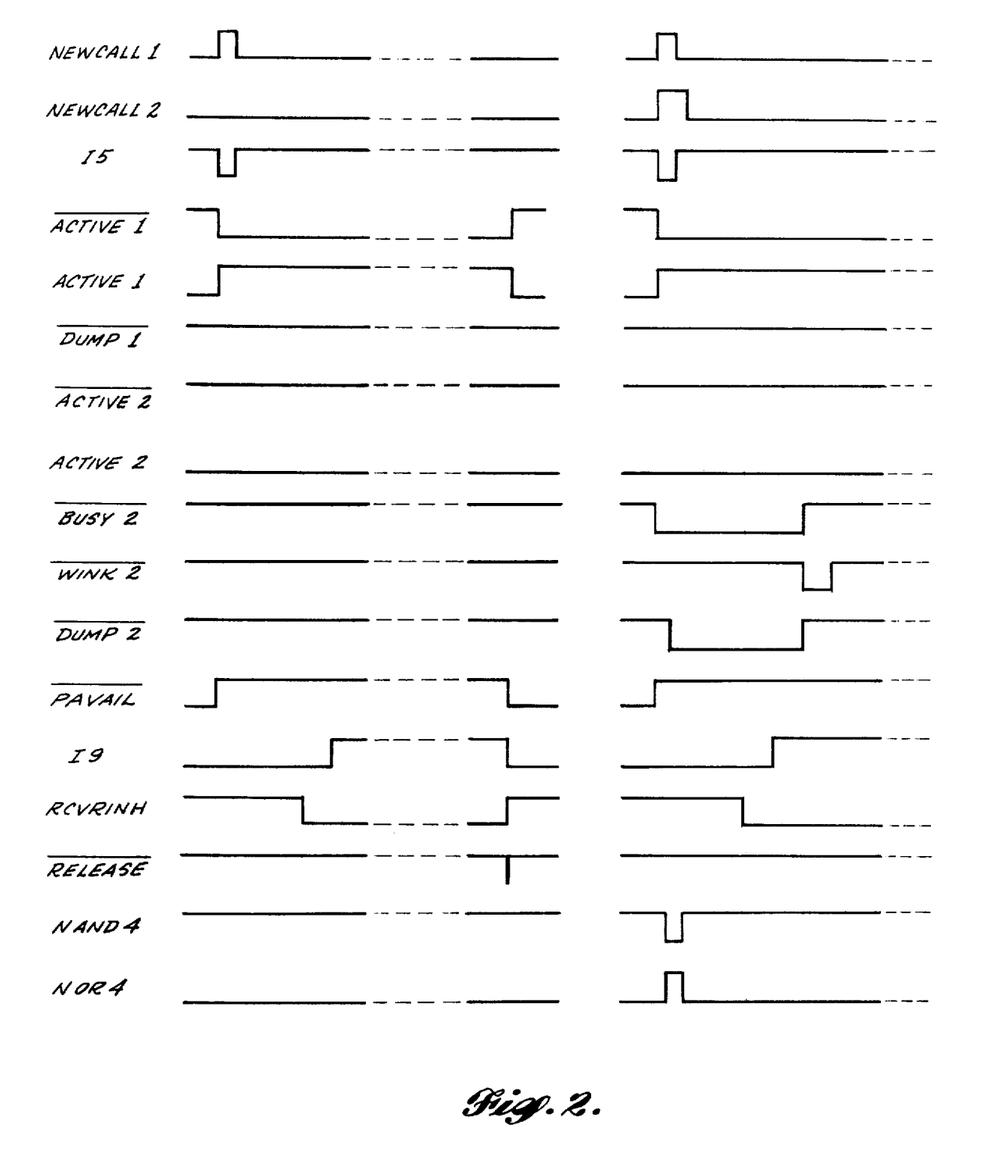
FIG. 2 is a timing diagram used to describe the operation of the embodiment of the invention illustrated in FIG. 1.

It will be appreciated from the foregoing description that, in essence, I1 detects the voltage at the junction between D3 and R8. When this voltage fluctuates, indicating that the related C-lead has been seized (grounded) by a telephone going off-hook, NEWCALL shifts from its idle binary zero state to a binary one state. This shift will only occur if the make-busy ground circuit 11 is not applying false busy status information, since under such circumstances, the inhibitor will prevent such a shift. This shift, as illustrated in FIG. 2 exists only for a predetermined period of time due to the incluse of a time constant circuit (formed by R12, CP2, R13, and D7) connected to the output of I3. The time period that NEWCALL is in its binary one state is primarily determined by the values of CP2 and R13 of the time constant circuit.

Each inhibitor 27 or 29 comprises: an NPN transistor designated Q3; and, three resistors designated R14, R15 and R16. R14 is connected between the collector of Q2 and the base of Q3. R15 is connected between the collector of Q3 and the junction between R9, D4, D6, I1 and D5. The base of Q3 is connected through R16 to $-V2$; and, the emitter of Q3 is connected to $-V2$. In operation, when Q2 senses that false busy status information is being applied by the make-busy ground circuit, Q3 is switched on to essentially clamp the voltage at the junction between R9, D4, D6, I1 and D5 to a predetermined voltage level determined by the value of $-V2$. This voltage level is adequate to prevent any voltage fluctuations sensed by the voltage divider from causing the busy detector to change NEWCALL from its idle binary zero state to a binary one state. However, if true external busy status information is present when false make-busy information is being applied, the true information "robs" current from R4. This action prevents the inhibitor from operating, allowing the busy detector to shift the state of NEW-CALL.

Each WINK circuit comprises: an inverter designated I4; a diode designated D8; a capacitor designated CP3; and, two resistors designated R17 and R18. The output of I3 is connected through R17 in series with CP3 to the input of I4. The input of I4 is also connected to the anode of D8. The cathode of D8 is connected to ground. R18 is connected in parallel with D8. $\overline{\text{WINK}}$ is formed at the junction between CP3, R18, D8 and I4. This junction is, thus, connected to one input of NAND1. Since the output of I4 is the complement of its input, the output of I4 is the signal designated WINK. In essence, when the voltage fluctuation across the voltage divider indicates the termination of a conversation, $\overline{\text{WINK}}$, which is normally in a binary one state, shifts to a binary zero state for a short period of time, determined by the values of CP3 and R18. When this short or "wink" period terminates, false busy status information is applied by the make-busy ground circuit 11, assuming circumstances exist for its application at all (i.e. the other link is attached to the port). The short period of time is adequate for the previously attached line to be released.

The first control circuit 35 comprises: two inverters designated I5 and I6; a two-input NAND gate designated NAND2; a three-input NAND gate designated NAND3; and, three two-input NOR gates NOR1, NOR2 and NOR3. NEWCALL 1 is applied through I5 to one input of NAND 2 and to one input of NOR1. The output of NAND2 is cross-coupled to one input of NAND3 and the output of NAND3 is cross coupled to one input of NAND2. Thus, NAND2 and NAND3 form a NAND gate latch. The output of NAND3 is the signal designated $\overline{\text{ACTIVE 1}}$. This signal, in addition to being applied to the linesplit relay circuit 39 is also applied to the input of I6. The output of I6, which is ACTIVE 1, is applied to the first link relay circuit 43. The output of NOR1 is applied to one input of NOR2, and the output of NOR2 is applied to one input of NOR3. WINK 1 is applied to the second input of NOR3, and the output of NOR3 is applied to the second input of NOR2. $\overline{\text{DUMP 1}}$ is formed at the output of NOR2. Thus, the output of NOR2 is also applied to the first linesplit relay circuit 39.

The second control circuit 37 comprises: one inverter designated I7; two two-input NAND gates designated NAND4 and NAND5; a three input NAND gate designated NAND6; and three two-input NOR gates designated NOR4, NOR5 and NOR6. The output of I5 is applied to one input of NAND4 and NEWCALL 2 is applied to the second input of NAND4. The output of NAND4 is applied to one input of NAND5 and to one input of NOR4. The output of NAND5 is connected to one input of NAND6 and the output of NAND6 is connected to the second input of NAND5. Thus, NAND5 and NAND6 form a second NAND gate latch. The output of NAND6 is the signal designated $\overline{\text{ACTIVE 2}}$ and is applied to the second linesplit relay circuit 41. $\overline{\text{ACTIVE 2}}$ is also applied to the second input of NOR1 of the first control circuit 35. Finally, $\overline{\text{ACTIVE 2}}$ is applied to the input of I7. The output of I7, thus, is the signal designated ACTIVE 2 and is applied to the second link relay circuit 45.

$\overline{\text{ACTIVE 1}}$ is applied to the second input of NOR4. The output of NOR4 is applied to one input of NOR5. The output of NOR5 is the signal designated $\overline{\text{DUMP 2}}$ and is applied to the second linesplit relay 41. $\overline{\text{DUMP 2}}$ is also applied to one input of NOR6. WINK 2 is applied to the second input of NOR6. The output of NOR6 is applied to the second input of NOR5. Finally, the output of NAND3 ($\overline{\text{ACTIVE 1}}$) is applied to the second input of NAND5; and the output of NAND5 ($\overline{\text{ACTIVE 2}}$) is applied to the second input of NAND3.

The combining circuit 46 comprises a two-input NAND gate designated NAND7. ACTIVE 1 and ACTIVE 2 are applied to the two inputs of NAND7. The output of NAND7 is the $\overline{\text{P AVAIL}}$ signal and is applied to the input of release circuit 47 and to the input of delay circuit 49. When both ACTIVE 1 and ACTIVE 2 are in binary one states, indicating that both links are idle, $\overline{\text{P AVAIL}}$ is in a binary zero state, indicating that the dual link illustrated in FIG. 1 is available for seizure.

The release circuit 47 comprises: a two-input NAND gate designated NAND 8; two inverters designated I8 and I9; two diodes designated D9 and D10; two capacitors designated CP4 and CP5; and, four resistors designated R19, R20, R21 and R22. $\overline{\text{P AVAIL}}$ is applied through R19 to the cathode of D9. The anode of D9 is connected through CP4 to −V2 and to the input of I8. R20 is connected in parallel with D9. The output of I8 is connected to the anode of D10. The cathode of D10 is connected through R21 in series with CP5 to −V2, and to the input of I9. R22 is connected to one input of NAND8. RCVRINH is applied to the second input of NAND8. The output of NAND8 is the signal designated $\overline{\text{RELEASE}}$ and is applied to the third inputs of NAND3 and NAND6.

The delay circuit 49 comprises: two inverters designated I10 and I11; two diodes designated D11 and D12; two capacitors designated CP6 and CP7; and, four resistors designated R23, R24, R25 and R26. $\overline{\text{P AVAIL}}$ is applied to the anode of D11. The cathode of D11 is connected through R23 in series with CP6 to −V2, and to the input of I10. The input of I10 is also connected through R24 to −V2. The output of R10 is connected through R5 to the cathode of D12. The anode of D12 is connected to the input of I11 and through CP7 to −V2. R26 is connected in parallel with D12. The output of I11 is connected to one of the inputs of the three input NAND gate, NAND1, forming part of the first and second make-busy ground circuits 11 and 13.

In operation, assuming first for purposes of discussion that both of the links illustrated in FIG. 1 are idle and that the related port is available, upon the occurrence of true busy information on one of the C-leads, for example, C1, the related NEWCALL signal, NEWCALL 1, shifts from a normal zero state to a one state. This situation is illustrated on the left side of FIG. 2. This shift in NEWCALL 1 causes the output of I5 (in this example) to set the NAND2/NAND3 such that $\overline{\text{ACTIVE 1}}$ shifts from its idle binary one state to a zero state and ACTIVE 1 to shift from a binary zero state to a binary one state. These shifts cause the first linesplit relay to split the T1/R1 leads; and, the link relay circuit to connect T1(IN) and R1(IN) to T(IN) and R(IN) and T1(OUT) and R1(OUT) to T(OUT) and R(OUT). In this manner, an attachment is made between the linefinder and the port; and, the port and the first selector. $\overline{\text{DUMP 1}}$, $\overline{\text{ACTIVE 2}}$, ACTIVE 2 and $\overline{\text{DUMP 2}}$ all remain in their idle or normal states. For a more complete discussion of the operation of the linesplit relay and link relay circuits during port attachment reference is made to said U.S. patent referenced above and incorporated herein by reference.

When ACTIVE 1 changed state, in addition to causing the linesplit relay action discussed above, it also caused P AVAIL to shift to a binary one state. This shift causes the second make-busy ground circit 13 to apply false busy status information to C2, which prevents another linefinder from attempting to seize the other link, as discussed above. When attachment is complete RCVRINH shifts to a binary zero state, holding RELEASE in a binary one state, as discussed above. Thereafter signal processing takes place.

The second control circuit operates in a substantially identical manner. If both links are idle when the lower link is attempting to seize the port, the NAND5-/NAND6 latch is set to a state such that ACTIVE 2 becomes a binary zero and ACTIVE 2 becomes a binary one, causing the second linesplit relay circuit 41 and the second link relay circuit 45 to attach the linefinder and first selector terminals to the input and output terminals of the associated port. At the same time the shift of P AVAIL to a binary one state causes the first make-busy ground circuit 11 to apply false busy status information to C1. Further, when attachment is complete, RCVRINH shifts to a binary one state and RELEASE remains in a binary one state.

In either case upon completion of signal processing RCVRINH returns to a binary one state, followed by RELEASE shifting to a binary zero state. This latter shift resets the set NAND gate latch and causes P AVAIL to return to a binary zero state. As noted above, the set latch is also reset if RCVRINH does not shift to a binary zero state within some predetermined time period after P AVAIL shifts to a binary one state, indicating that an attachment is being sought. Such a condition could occur if, for example, the signal processor is inoperative. This internal time delay is provided by the resistor/diode/capacitor/inverter network coupling the output of the combining circuit 46 to its related input of NAND8.

As noted above, the delay circuit merely delays the termination of false busy status information for a short period after the active state of the attaching link ends. This time delay is necessary to allow the signal processor to clear out or settle down between attachments. The delay causes the related input of NAND1 remaining in a one state for a short period of time after P AVAIL shifts to a zero state.

It will be appreciated that it is possible for C1 AND C2 to simultaneously be seized by related telephones going offhook and, thus, cause both links to simultaneously attempt attachment to the port. The invention prevents such action from occurring by a built in priority arrangement. As illustrated on the right side of FIG. 2, in the dual link embodiment of the invention illustrated in FIG. 1, the priority arrangement is performed by NAND 4 in combination with the binary one state time duration of the NEWCALL signals. More specifically, as noted above the time duration of NEWCALL in its binary one state after a busy signal is applied to a C-lead is determined by the values of CP2 and R13. In accordance with this invention, thus, NEWCALL 1 has a different time duration than NEWCALL 2. Assuming that the time duration of NEWCALL 1 is less than the time duration of NEWCALL 2, and recognizing that the latches are set (switch their ACTIVE and ACTIVE outputs to one and zero states, respectively) when the NEWCALL related inputs (outputs of I5 and NAND4) to the latches shift from one to zero, it will be apparent that the NAND2/NAND3 latch will set before the NAND5/NAND6 latch if NEWCALL 1 and NEWCALL 2 start simultaneously. On the other hand, if NEWCALL 2 starts its pulse period slightly before the NEWCALL 1 pulse period starts, then the NAND5-/NAND6 latch will set before the NAND2/NAND3 latch. The setting of one latch, due to the crosscoupling between latches, will inhibit or prevent the setting of the other latch.

Even though the setting of one latch will prevent the setting of the other latch, the linefinder related to the non-set latch would be held absent the shift of the related DUMP signal from one to zero. More specifically, assuming the NAND2/NAND3 latch is set while a NEWCALL 2 pulse exists. This set of conditions, as also illustrated on the right side of FIG. 2, causes both inputs to NOR4 (i.e. ACTIVE 1 and the output of NAND4) to achieve binary zero states. The thusly formed binary one on the output of NOR4 sets the NOR gate latch formed by NOR5 and NOR6 to cause a temporary shift of DUMP 2 from a binary one state to a binary zero state. This shift or pulse, as described in said U.S. Patent causes the linesplit relay circuit to split the line without an attachment occurring. This action releases the related line, allowing it to seek a link having an available port. When the linefinder is released WINK 2 shifts from a binary zero state to a binary one state to reset the NOR5/NOR6 latch, whereby DUMP 2 returns to a binary one state. The dump function operates in a similar manner should true busy information be applied to one link while the other link is attached to the port.

It will be appreciated by those skilled in the art and others, that FIG. 1 merely illustrates a dual link embodiment of the invention. It will also be appreciated that this basic structure can be readily expanded to a multiplicity of links, for example, six links. In this regard, each link will include a make-busy ground circuit, a current sensor, an inhibitor, a voltage divider, a busy detector, a wink circuit, and a control circuit. In addition, the system will have common combining, release and delay circuits. However, a few minor changes will have to be made. For example, the simple cross-coupling of the two latch circuits of the dual link embodiment of the type illustrated in FIG. 1 can no longer be utilized. Thus, the control circuit arrangement must be slightly different. Moreover, multiple input NAND gates, having an input number related to the order of priority of a particular link, must be included. A generalized diagram of a control circuit including these changes is illustrated in FIG. 3.

Figure 3:
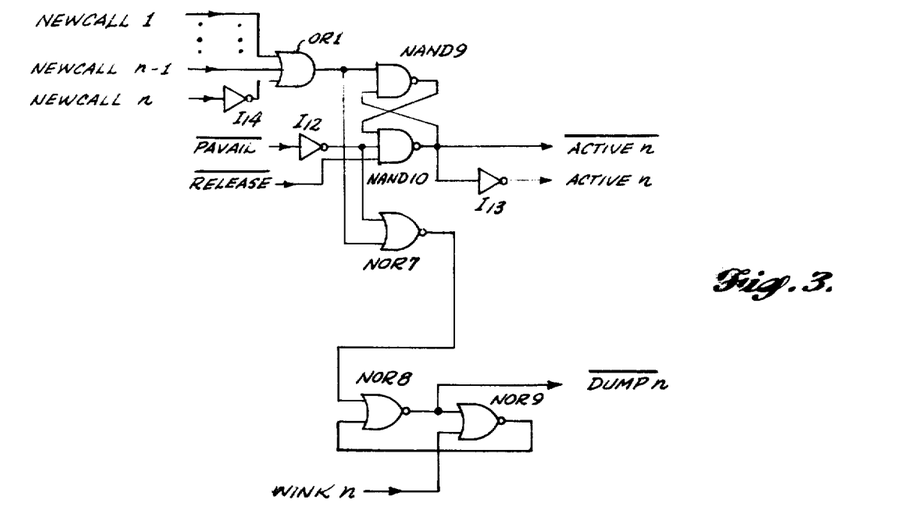
FIG. 3 is a logic diagram of a control circuit suitable for use in a multiple link circuit formed in accordance with the invention.
Figure 5:
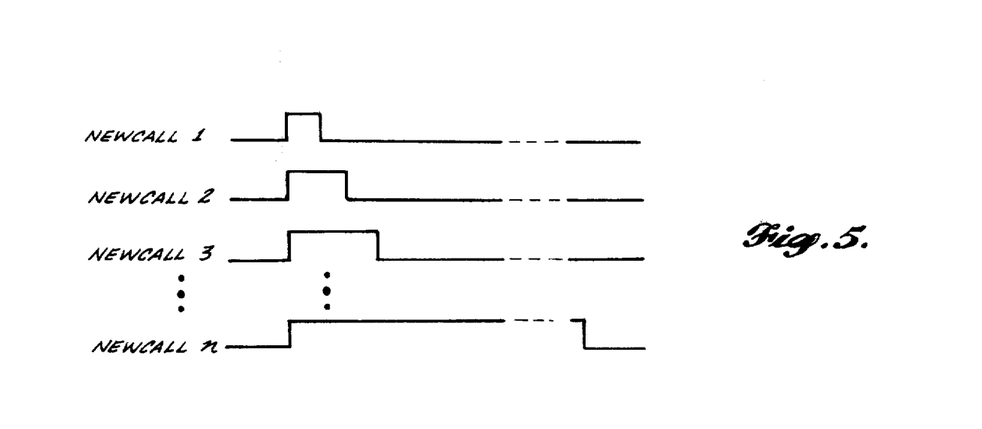

The control circuit illustrated in FIG. 3 comprises: a multiple input OR gate designated OR1; one two-input NAND gate designated NAND9; one three-input NAND gate designated NAND10; three two-input NOR gates NOR7, NOR8 and NOR9; and three inverters designated I12, I13 and I14. OR1 has a number of inputs related to the priority number of the particular link with which the control circuit is associated. All NEWCALL signals up to the priority number of the particular control circuit are applied directly to the inputs of OR1. In addition, the NEWCALL signal having the priority number of the particular control circuit (NEWCALL n) is applied to an input of OR1 via an inverter (I14). Thus, if the control circuit is the control circuit for link number 5, OR1 is a five input gate and receives signals designated NEWCALL 1, NEWCALL 2, NEWCALL 3, and NEWCALL 4; and, NEWCALL 5 through I14. As discussed above, with respect to FIG.

i, the NEWCALL signals are of different duration, depending upon the particular link to which they relate. FIG. 5 illustrates this time duration arrangement for an $n$ link embodiment of the invention. Specifically, each higher order NEWCALL number has a time duration greater than any lower number. The time duration, as noted above, is controlled by the values of R13 and CP2 of the busy detector.

The output of OR1 is connected to one input of NAND9 and to one input of NOR7. The outputs of NAND9 and NAND10 are cross-coupled to inputs of the opposite gate and, thus, NAND9 and NAND10 form a NAND gate latch. The output of NAND10 is $\overline{\text{ACTIVE } n}$ (where n is the number of the particular control circuit) and is applied to the input of I13. The output of I13, thus, is ACTIVE $n$. $\overline{\text{RELEASE}}$ is applied to the second input of NAND10. In addition, $\overline{\text{P AVAIL}}$ is applied through I12 to the third input of NAND10. and to one input of NOR7. Since $\overline{\text{P AVAIL}}$ relates to the status of the $\overline{\text{ACTIVE}}$ outputs of the latches, the output of I12 performs the same function as the latch cross-coupling arrangement illustrated in FIG. 1 and discussed above. That is, $\overline{\text{P AVAIL}}$ prevents any other latch setting after one latch is set.

The output of NOR7 is applied to one input of NOR8. The output of NOR8 is a signal designated $\overline{\text{DUMP } n}$ and is applied to the input of NOR9. The output of NOR9 is applied to the second input of NOR8. WINK $n$ is applied to the second input of NOR9. Since NOR7, NOR8 and NOR9 are connected and function in the same manner as the three NOR gates of the first and second control circuits illustrated in FIG. 1, they will not be further discussed here.

Figure 4:
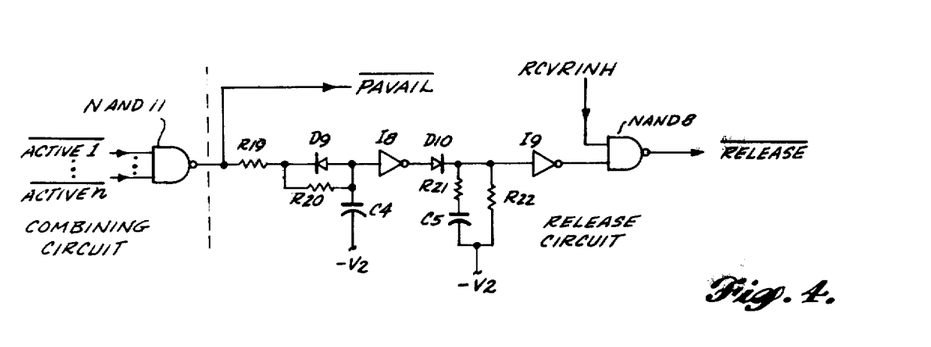
FIG. 4 is a schematic diagram illustrating a combining circuit and a release circuit suitable for use in a multiple link circuit formed in accordance with this invention; and, FIG. 5 is a timing diagram illustrating the timing of NEWCALL signals developed in a multiple link circuit formed in accordance with the invention.

FIG. 4 illustrates a combining and release circuit for use in a multiple embodiment of the invention. Since the release circuit is identical to the release circuit illustrated in FIG. 1, it will not be further discussed. The combining circuit is also similar to the combining circuit illustrated in FIG. 1 except that it includes a multiple input NAND gate designated NAND11 rather than a two-input NAND gate. The number of inputs of NAND11 is equal to the number of $\overline{\text{ACTIVE}}$ signals, which, in turn, is related to the particular number of links to be included in the multiple link embodiment of the invention.

While preferred embodiments of the invention have been illustrated and described, it will be appreciated by those skilled in the art and others that various changes can be made therein without departing from the spirit and scope of the invention. For example, gating and latching arragements other than those specifically illustrated in the drawings can be utilized, if desired. Further, other variations, obvious to those skilled in the art, can be made, as necessary and desirable, depending upon the operation and the particular telephone system with which the invention is to be used. For example, if true busy status is created in some manner other than by grounding a C-lead, the make-busy ground circuits can be changed such that the false busy status information is similar. Hence, the invention can be practiced otherwise than as specifically described herein.

The embodiments of the invention in which exclusive property or privilege is claimed are defined as follows:

1. In a multiple link circuit for a port multiplexer including a plurality of links for: detecting the placing of busy status information on the C-leads of a telephone system extending between linefinder/first selector combinations; splitting related linefinder/first selector tip and ring leads; and, connecting the related linefinder/first selector tip and ring leads to a port, the improvement comprising:
   detecting means, forming a portion of each of said plurality of links, for detecting said busy status information carried by said C-leads, said detecting means being bridge connected to said C-leads.

2. The improvement claimed in claim 1 wherein said busy status information is created by grounding a C-lead and wherein said detecting means detects the grounding of a C-lead.

3. The improvement claimed in claim 2 including: a priority determining arrangement that gives one link priority of port connection over another link where said two links attempt to substantially simultaneously connect their related linefinder/first selector tip and ring leads to said port.

4. The improvement claimed in claim 3 wherein:
   the detecting means of each of said links generates a pulse designated NEWCALL when it detects busy status information, the time duration of the pulses generated by said detecting means varying in accordance with said priority determining arrangment; and,
   said priority determining arrangement comprises a combining means forming part of each link, said combining means connected to receive the pulses produced by each link having a higher priority and its related link, and adapted to allow a connection between its related line finder/first selector tip and ring leads and said port to be made only in the absence of NEWCALL pulses produced by higher priority links.

5. In a multiple link circuit for a port multiplexer including a plurality of links for: detecting the placing of busy status information on the C-leads of a telephone system extending between linefinder/first selector combinations; splitting related linefinder/first selector tip on ring leads; and, connecting the related linefinder/first selector tip and ring leads to a port, the improvement comprising:
   an internal priority determining arrangement that gives one link priority of port connection over another link when said two links attempt to substantially simultaneously connect their related linefinder/first selector tip and ring leads to said port.

6. The improvement claimed in claim 5 wherein:
   each of said links generates a pulse designated NEWCALL when it detects busy status information, the time duration of the NEWCALL pulses generated by said links varying in accordance with said priority determining arrangement; and,
   said priority determining arrangement comprises a combining means forming part of each link, said combining means connected to receive the NEWCALL pulses produced by each link having a higher priority and its related link, and adapted to allow a connection between its related line finder/first selector tip and ring leads and said port to be made only in the absence of NEWCALL pulses produced by higher priority links.

7. A multiple link circuit for detecting busy status information carried by the C-leads of a telephone system and, in accordance therewith, attaching related tip and ring leads to a port for further connection to a signal processor, said multiple link circuit comprising:
   A. a plurality of links, each link comprising:

1. a busy detecting means for detecting the existence of true busy status information on a C-lead, said busy detector being bridge connectable to said C-lead;
2. a control circuit means, connected to said busy detecting means, for creating control signals related to the detecting of busy status information by said busy detecting means;
3. coupling means, connected to said control circuit means, for splitting tip and ring leads related to said C-lead and connecting the split tip and ring leads to port input and output leads when said control signals are in a predetermined state and, thereby, forming an attachment between said split tip and ring leads and said port input and output leads; and,
4. make-busy means, bridge connectable to said C-lead, for applying false busy status information to said C-lead when any other link of said plurality of links is attaching its related tip and ring leads to said port input and output leads; and, B. common means, connected to said plurality of links, for sensing when any of said links detect the existence of busy status information on a related C-lead and, in accordance therewith, applying a further control signal to the make-busy means of said links that causes the make-busy means of all other links to apply said false busy status information to their related C-leads.

8. A multiple link circuit as claimed in claim 7, wherein the false busy status information is only applied in the absence of true busy status information on the related C-lead.

9. A multiple link circuit as claimed in claim 7, wherein:

said plurality of links is equal to $n$;

the busy detecting means of each of said links includes a busy detector that produces a binary control signal designated NEWCALL;

each NEWCALL signal has a different time duration; and each of said time durations is related to a predetermined priority number assigned to each link.

10. A multiple link circuit as claimed in claim 9, wherein the control circuit means of each link includes;

a combining means for receiving the NEWCALL signal produced by its related busy detector and the NEWCALL signals produced by the busy detectors of all higher priority links, if any, and producing an output having a predetermined binary state when all higher priority NEWCALL signals are in a predetermined binary state; and, a latch connected to receive the output of its related combining circuit so as to set when said output changes to said predetermined binary state.

11. A multiple link circuit as claimed in claim 10 wherein the latches of the links are connected together in a manner such that the latch of a particular link is set only if the latches of higher priority links are not set.

12. A multiple link circuit as claimed in claim 10 wherein each of said plurality of links also includes a voltage divider for bridge connecting a C-lead to the busy detector of its related link.

13. A multiple link circuit as claimed in claim 12 wherein each of said make-busy means includes:

a make-busy ground circuit for applying a ground to the C-lead to which the make-busy means is bridge connectable, said ground creating said false busy status information;

a current sensor connected to the make-busy ground circuit for detecting the application of ground to a related C-lead by said make-busy ground circuit; and, an inhibitor connected to said current sensor for detecting when said current sensor senses the application of a ground by said make-busy circuit and to said busy detector for preventing the production of a NEWCALL signal by said busy detector when said make-busy ground circuit is applying a ground.

14. A multiple link circuit as claimed in claim 13 wherein said common means includes a release circuit, connected to receive said further control signal and adapted to receive a signal from a port denoting the idle or active state of said port, for producing a release signal when said port shifts from an active state to an idle state, said release signal being applied to the latches of said control circuit means so as to reset any of the latches of said control circuit that are set.

15. A multiple link circuit as claimed in claim 14 wherein:

the control signals generated by said control circuit are complementary signals designated ACTIVE and $\overline{\text{ACTIVE}}$; and, said coupling means includes a linesplit relay circuit adapted to receive said $\overline{\text{ACTIVE}}$ signal and a link relay circuit adapted to receive said ACTIVE signal, said linesplit relay circuit adapted to split the line between linefinder input leads and first selector output leads, and said link circuit adapted to connect said split input leads to said port input and output leads.

16. A multiple link circuit as claimed in claim 15 wherein each of said links includes a WINK circuit, said WINK circuit connected to said busy detector for detecting the termination of busy status information and for producing a short WINK pulse in accordance therewith, said WINK pulse being applied to the make-busy ground circuit of the link to which it is related so as to delay the application of a ground by said make-busy ground circuit upon the termination of said busy status information.

17. A multiple link circuit as claimed in claim 16 including a delay cicuit for delaying the application of the termination of said further control signal to said make-busy ground circuits.

* * * * *